(12) United States Patent
Jo

(10) Patent No.: US 11,791,517 B2
(45) Date of Patent: Oct. 17, 2023

(54) POUCH, SECONDARY BATTERY COMPRISING THE SAME, AND METHOD FOR MANUFACTURING THE SECONDARY BATTERY

(71) Applicant: LG Chem, Ltd., Seoul (KR)

(72) Inventor: Un Jo, Daejeon (KR)

(73) Assignee: LG Energy Solution, Ltd.

(*) Notice: Subject to any disclaimer, the term of this patent is extended or adjusted under 35 U.S.C. 154(b) by 58 days.

(21) Appl. No.: 16/961,422

(22) PCT Filed: Aug. 29, 2019

(86) PCT No.: PCT/KR2019/011090
§ 371 (c)(1),
(2) Date: Jul. 10, 2020

(87) PCT Pub. No.: WO2020/046018
PCT Pub. Date: Mar. 5, 2020

(65) Prior Publication Data
US 2020/0373535 A1    Nov. 26, 2020

(30) Foreign Application Priority Data
Aug. 31, 2018  (KR) .................. 10-2018-0103911

(51) Int. Cl.
*H01M 50/325* (2021.01)
*H01M 50/105* (2021.01)
*H01M 50/186* (2021.01)

(52) U.S. Cl.
CPC ....... *H01M 50/325* (2021.01); *H01M 50/105* (2021.01); *H01M 50/186* (2021.01)

(58) Field of Classification Search
CPC ............. H01M 50/325; H01M 50/183; H01M 50/184; H01M 50/178; H01M 50/186; H01M 50/19; H01M 50/193
(Continued)

(56) References Cited

U.S. PATENT DOCUMENTS 7,682,735 B2 * 3/2010 Lee ................... H01M 10/0587
429/176
2004/0121231 A1  6/2004 Kim
(Continued)

FOREIGN PATENT DOCUMENTS

| CN | 1508899 A | 6/2004 |
| CN | 1610166 A | 4/2005 |

(Continued)

OTHER PUBLICATIONS

Extended European Search Report including Written Opinion for Application No. EP19854733.3 dated Feb. 24, 2021, 11 pgs.
(Continued)

*Primary Examiner* — Matthew T Martin
*Assistant Examiner* — Paul Christian St Wyrough
(74) *Attorney, Agent, or Firm* — Lerner David LLP

(57) ABSTRACT

A pouch applied to a secondary battery includes an accommodation part configured to accommodate an electrode assembly; a sealing part provided outside the accommodation part, the sealing part having a plurality of sealing surfaces configured to seal the accommodation part; and a protection part provided outside one or more of the plurality of sealing surfaces of the sealing part, the protection part being configured to protect the one or more sealing surfaces.

15 Claims, 14 Drawing Sheets

(58) Field of Classification Search
USPC .......................................................... 429/53
See application file for complete search history.

(56) References Cited

U.S. PATENT DOCUMENTS

| | | | |
|---|---|---|---|
| 2005/0084749 A1 | 4/2005 | Hwang et al. | |
| 2009/0311581 A1 | 12/2009 | Park et al. | |
| 2010/0028772 A1 | 2/2010 | Yang et al. | |
| 2011/0244315 A1 | 10/2011 | Yoon | |
| 2013/0244093 A1 | 9/2013 | Min et al. | |
| 2014/0212701 A1 | 7/2014 | Hur | |
| 2015/0303414 A1 | 10/2015 | Park et al. | |
| 2016/0315294 A1* | 10/2016 | Kim | H01M 50/119 |
| 2018/0304504 A1 | 10/2018 | Lee | |
| 2018/0342715 A1* | 11/2018 | Ha | H01M 50/557 |

FOREIGN PATENT DOCUMENTS

| | | |
|---|---|---|
| CN | 101517776 A | 8/2009 |
| CN | 102208673 A | 10/2011 |
| CN | 202495539 U | 10/2012 |
| CN | 202687165 U | 1/2013 |
| CN | 104064815 A | 9/2014 |
| CN | 105900274 A | 8/2016 |
| CN | 106207020 A | 12/2016 |
| EP | 2375469 A1 | 10/2011 |
| EP | 2760061 A1 | 7/2014 |
| JP | 2000173563 A | 6/2000 |
| JP | 2005116278 A | 4/2005 |
| JP | 2008251540 A | 10/2008 |
| JP | 2015069959 A | 4/2015 |
| JP | 2016015225 A | 1/2016 |
| KR | 20000075255 A | 12/2000 |
| KR | 20040005022 A | 1/2004 |
| KR | 100958649 B1 | 5/2010 |
| KR | 20130080071 A | 7/2013 |
| KR | 20130119556 A | 11/2013 |
| KR | 20130134963 A | 12/2013 |
| KR | 20170092246 A | 8/2017 |
| KR | 20170092740 A | 8/2017 |

OTHER PUBLICATIONS

International Search Report for Application No. PCT/KR2019/011090, dated Dec. 6, 2019, pp. 1-2.
Search Reported dated Mar. 16, 2022 from the Office Action for Chinese Application No. 2019800083861 dated Mar. 24, 2022, 2 pgs. see p. 2, categorizing the cited references.
Search Reported dated Nov. 11, 2022 from the Office Action for Chinese Application No. 201980008386.1 dated Nov. 18, 2022. 3 pgs.

* cited by examiner

POUCH, SECONDARY BATTERY COMPRISING THE SAME, AND METHOD FOR MANUFACTURING THE SECONDARY BATTERY

CROSS-REFERENCE TO RELATED APPLICATIONS

The present application is a national phase entry under 35 U.S.C. § 371 of International Application No. PCT/KR2019/011090, filed Aug. 29, 2019, published in Korean, which claims the benefit of the priority of Korean Patent Application No. 10-2018-0103911, filed on Aug. 31, 2018, both of the disclosures of which are hereby incorporated by reference in their entirety.

TECHNICAL FIELD

The present invention relates a pouch, a secondary battery comprising the same, and method for manufacturing the secondary battery, and more particularly, to a pouch that is capable of protecting a sealing part and an accommodation part thereof without folding the sealing part and the accommodation part, a secondary battery comprising the same, and a method for manufacturing the secondary battery.

BACKGROUND ART

In general, secondary batteries refer to chargeable and dischargeable batteries, unlike primary batteries that are not chargeable. Such a secondary battery is being widely used in the high-tech electronic fields such as mobile phones, notebook computers, and camcorders.

Such a secondary battery is classified into a can type secondary battery in which an electrode assembly is built in a metal can and a pouch type secondary battery in which an electrode assembly is built in a pouch. The pouch type secondary battery comprises an electrode assembly in which an electrode and a separator are alternately stacked, an electrolyte, and a pouch accommodating the electrode assembly and the electrolyte. Also, the pouch comprises an accommodation part accommodating the electrode assembly and an electrolyte and a sealing part sealing the accommodation part.

However, the pouch type secondary battery has a problem in that the sealing part and the accommodation part of the pouch are deformed while being easily folded by an external impact. Particularly, when the accommodation part is deformed, the electrode assembly accommodated in the accommodation part may be damaged to cause short circuit or ignition.

DISCLOSURE OF THE INVENTION

Technical Problem

The present invention has been invented to solve the above problems. An object of the present invention is to provide a pouch that is capable of preventing a sealing part and an accommodation part thereof from being deformed by providing a protection part outside the pouch, thereby preventing an electrode assembly accommodated in the accommodation part from being damaged, a secondary battery comprising the pouch, and a method for manufacturing the secondary battery.

Technical Solution

To achieve the above-described objects, a pouch according to a first embodiment of the present invention comprises: an accommodation part configured to accommodate an electrode assembly; a sealing part provided outside the accommodation part, the sealing part having a plurality of sealing surfaces configured to seal the accommodation part; and a protection part provided outside one or more of the plurality of sealing surfaces of the sealing part, the protection part being configured to protect the one or more sealing surfaces.

The protection part may be provided with one or more protrusions for reinforcing strength.

The one or more protrusions may be provided by allowing a portion of the protection part to protrude outward or by attaching a component made of a synthetic resin material to the protection part.

The protrusions may be disposed on both ends of the protection part, which are adjacent to the corner portion of the accommodation part.

The protection part may be provided on the sealing surface of the plurality of sealing surfaces disposed on one side or each of both sides in a width direction of the pouch.

The pouch may further comprise a gas pocket part configured to collect a gas generated in the accommodation part, wherein the accommodation part may be provided at one side in a width direction of the pouch, and the gas pocket part may be provided at another side in the width direction of the pouch, and the protection part may be provided on each of the sealing surface of the plurality of sealing surfaces disposed at one side of the accommodation part and the sealing surface of the plurality of sealing surfaces disposed at another side of the gas pocket part in the width direction of the pouch.

A secondary battery according to a second embodiment of the present invention comprises: an electrode assembly; and a pouch comprising: an accommodation part in which the electrode assembly is disposed; a sealing part provided outside the accommodation part, the sealing part having a plurality of sealing surfaces configured to seal the accommodation part; and a protection part provided outside one or more of the plurality of sealing surfaces of the sealing part, the protection part being configured to protect the one or more sealing surfaces.

The protection part may be removable from each of the sealing surfaces.

The protection part may not be thermally fused.

A method for manufacturing a secondary battery according to the second embodiment of the present invention comprises: a pouch sheet preparation step of preparing a pouch sheet on which an upper pouch and a lower pouch are formed with respect to a horizontal center line that equalizes the pouch sheet vertically; an accommodation part forming step of forming an upper accommodation part and a lower accommodation part, which respectively correspond to the upper pouch and the lower pouch; a protection part formation step of forming one or more protrusions that protrude outside from left and right ends of the upper pouch and the lower pouch to form a protection part; an accommodation part formation step of folding the upper pouch and the lower pouch with respect to the horizontal center line so that the upper and lower accommodation parts are connected to each other to form an accommodation part; and a sealing part formation step of sealing a portion between the accommodation part and the protection part and upper and lower ends of the accommodation part to manufacture the secondary battery.

The accommodation part forming step and the protection part formation step may be performed at the same time.

The sealing part formation step may further comprise a process of further sealing a portion between the accommodation part and the sealing part to form a gas pocket part between the accommodation part and the sealing part, and the accommodation part and the gas pocket part may be connected to each other through a non-sealed path.

The method may further comprise, after the sealing part formation step, a transfer step of accommodating the secondary battery in a tray to transfer the secondary battery, wherein the secondary battery may be accommodated so that the protection part is supported by a side surface of a bottom surface of the tray.

The method may further comprise, after the transfer step, a protection part removing step of removing the protection part from each of the sealing surfaces of the pouch.

The method may further comprise, after the removing step, a sealing part resealing step of resealing the sealing part from which the protection part is removed.

In the sealing part formation step, the protection part may not be sealed.

Advantageous Effects

The present invention has the feature in which the protection part is disposed outside the pouch. Due to this feature, the sealing part and the accommodation part, which are provided in the pouch, may be protected to prevent deformation such as the bucking or the folding of the sealing part and the accommodation part from occurring, in particular, prevent the electrode assembly accommodated in the accommodation part from being damaged.

Also, the protection part of the present invention may further comprise the one or more protrusions. Thus, the protection part may be reinforced in strength to significantly prevent the sealing part and the accommodation part of the pouch from being deformed.

Also, the protrusion of the present invention may be formed by allowing a portion of the protection part from protruding outside. Thus, the protrusion may be easily formed to simplify the process and reduce the process cost.

The protrusion of the present invention may be detachably attached to one side of the protrusion part. Thus, the protrusion may be selectively attached or separated to improve convenience and efficiency of use.

Also, the protrusion of the present invention may be formed at the end of the protection part, which is close or adjacent to the corner portion of the accommodation part. Thus, the corner portion of the accommodation part, which may be easily deformed, may be more stably protected to prevent the corner portion of the electrode assembly, which is disposed at the corner portion of the accommodation part, from being damaged.

Also, the protection part of the present invention may be provided at one side or both sides of the pouch in the width direction. That is, the protection part may be formed at only the portion of the secondary battery, which contacts the jig or the tray, to simplify the process and reduce the process cost.

MODE FOR CARRYING OUT THE INVENTION

Figure 1:
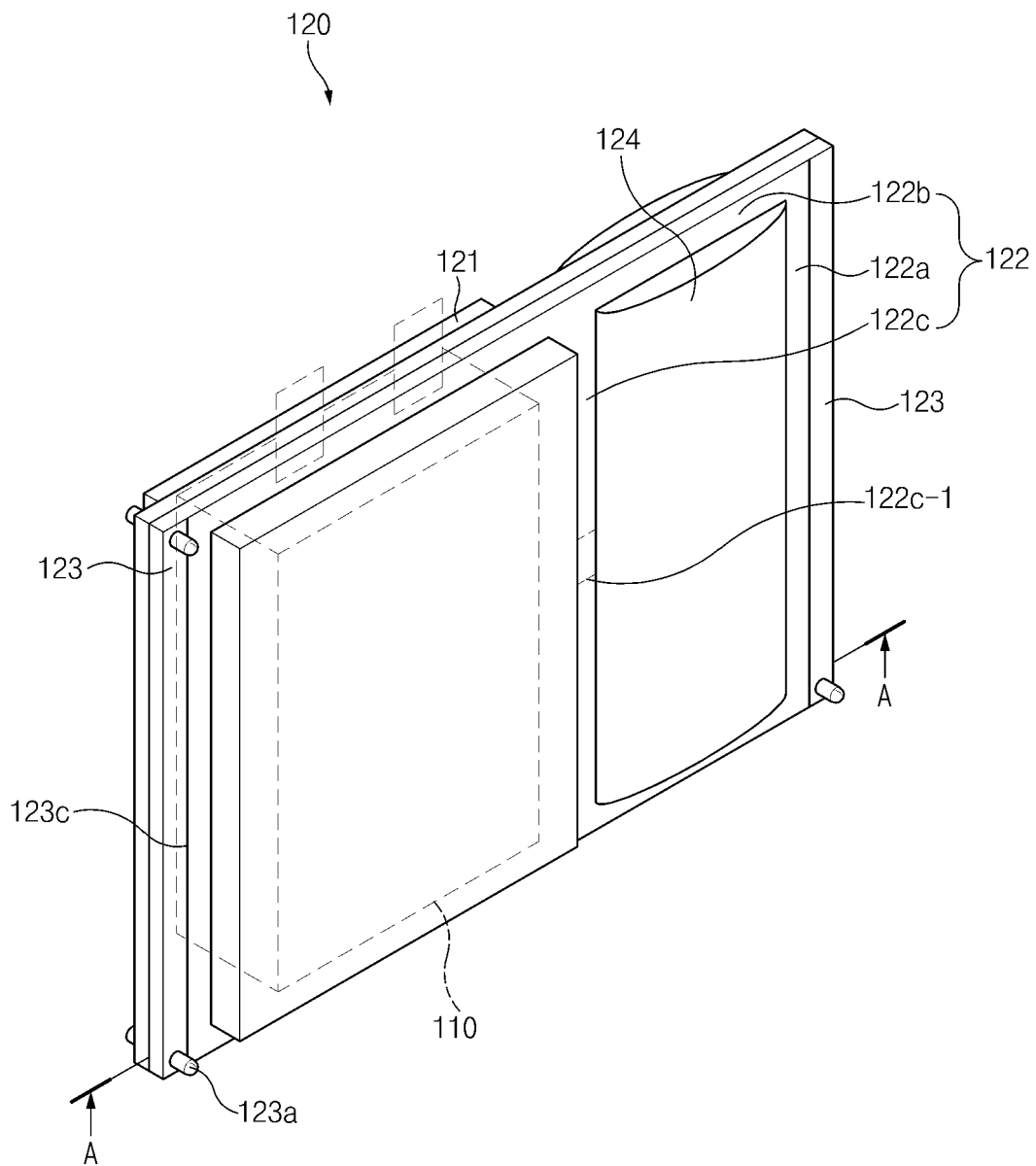
FIG. 1 is a perspective view of a pouch according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Pouch According to First Embodiment of the Present Invention]

Figure 2:
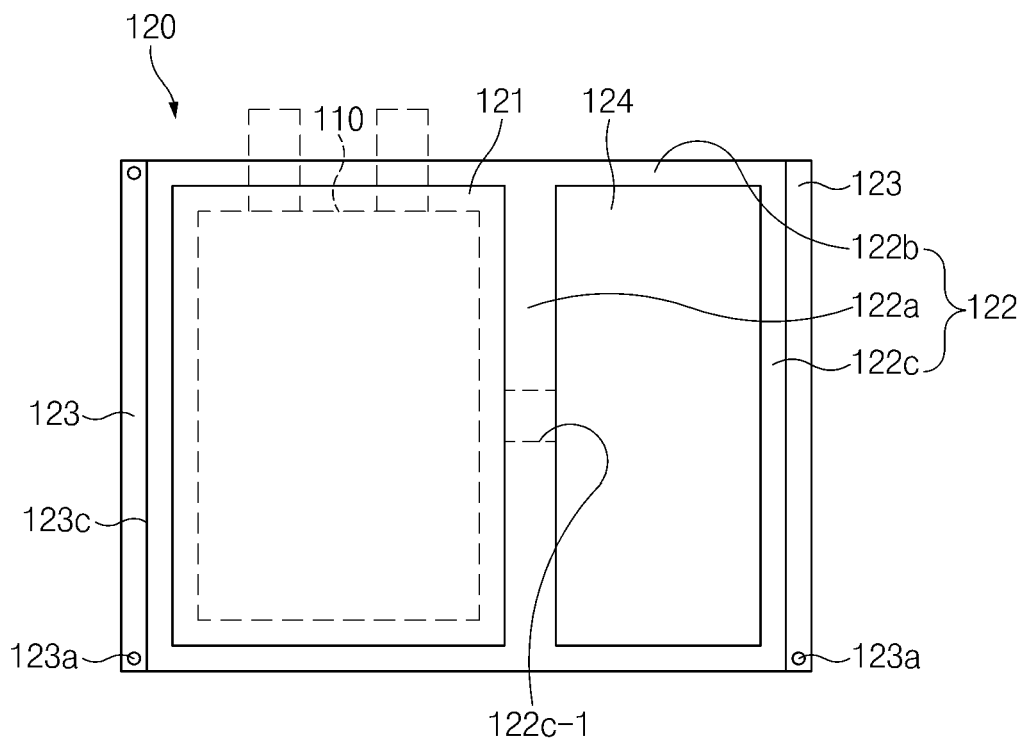
FIG. 2 is a front view of the pouch according to the first embodiment of the present invention.
Figure 3:
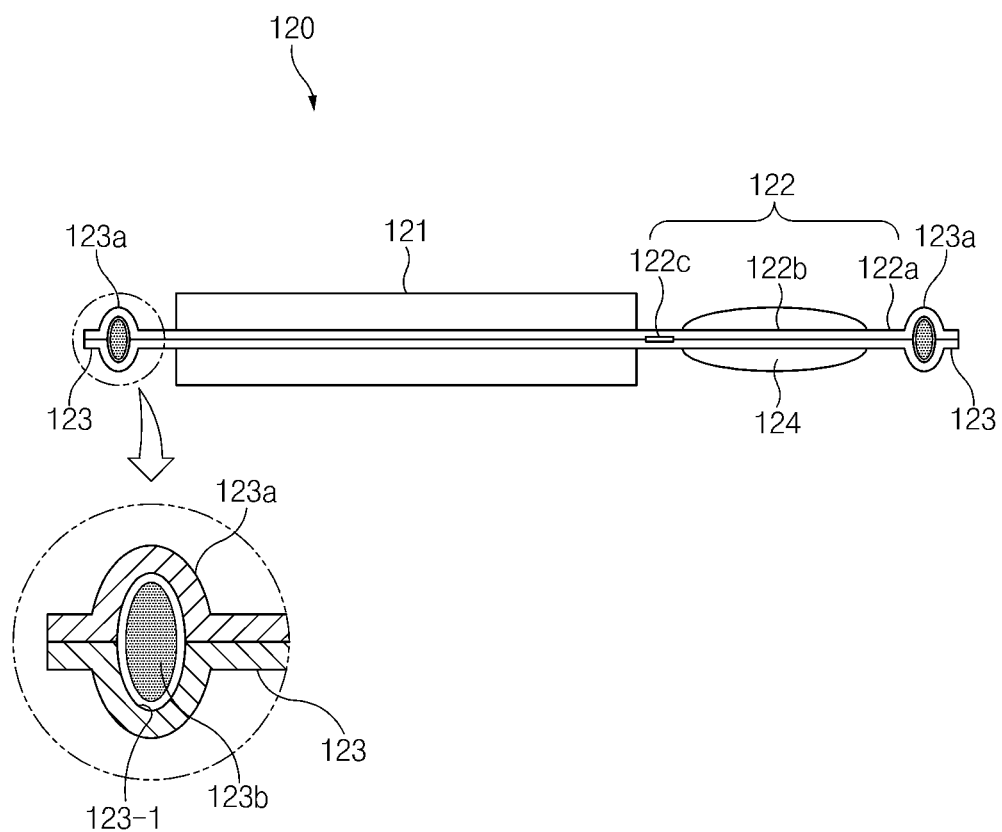
FIG. 3 is a cross-sectional view taken along line A-A of FIG. 1.

As illustrated in FIGS. 1 to 3, a pouch 120 according to a first embodiment of the present invention comprises an accommodation part 121 accommodating an electrode assembly 110 and a sealing part 122 provided along an edge of the accommodation part 121 to seal the accommodation part 121.

Here, the sealing part 122 comprises a plurality of sealing surfaces for sealing the accommodation part 121. As illustrated in FIG. 1, the plurality of sealing surfaces comprise a first sealing surface 122a disposed on each of both side surfaces in a width direction (in a left and right direction when viewed in FIG. 1) of the electrode assembly accommodation part 121 and a second sealing surface 122b disposed on each of top and bottoms surfaces (upper and lower portions of the accommodation part when viewed in FIG. 1) of the accommodation part 121.

Also, the pouch 120 according to the first embodiment of the present invention comprises a gas pocket part 124 for collecting a gas generated in the accommodation part 121. Referring to FIG. 1, the gas pocket part 124 is provided between the accommodation part 121 and the first sealing surface 122a provided on the right surface of the pouch and is separated from the accommodation part 121 by an auxiliary sealing surface 122c in which an inlet hole 122c-1 is defined.

In summary, in the pouch 120 according to the first embodiment of the present invention, the accommodation part 121 is provided at a left side, and the gas pocket part 124 is provided at the right side. The sealing part 122 is disposed on edge surfaces of the accommodation part 121 and the gas pocket part 124, and the auxiliary sealing surface 122c is disposed between the accommodation part 121 and the gas pocket part 124.

The pouch is transferred through a jig or a tray. Here, the sealing part and the accommodation part of the pouch may be buckled or folded by the jig or the tray. In particular, when the electrode assembly is accommodated in the accommodation part, even the electrode assembly may be damaged.

In order to solve the above problems, the pouch 120 according to the first embodiment of the present invention comprises a protection part that protects the sealing part while increasing in a width of the sealing part.

That is, the pouch 120 according to the first embodiment of the present invention comprises the protection part 123 that is provided outside one or more sealing surfaces of the sealing part 122 to protect the one or more sealing surfaces. A first sealing surface 122a disposed outside the pouch 120 may increase in width, and simultaneously, be improved in strength of the first sealing surface 122a to protect the first sealing surface 122a through the protection part 123.

That is to say, in the pouch 120 according to the first embodiment, when the jig holds the pouch, the jig may hold the sealing part 122 and the protection part 123 together to prevent the accommodation part from being held, thereby preventing the accommodation part from being deformed. Also, referring to FIG. 10, when the tray 30 transfers the pouch, the protection part 123 may be supported by a wall of the tray 30 to prevent the sealing part from being directly supported by the tray 30, thereby preventing the sealing part 122 and the accommodation part 121 from being folded by folding of the protection part 123 due to an impact acting on the tray 30.

As described above, the pouch 120 according to the first embodiment of the present invention further comprises the protection part 123. Thus, the deformation of the accommodation part 121 and the sealing part 122 may be prevented from being deformed to prevent the electrode assembly accommodated in the accommodation part from being damaged, thereby improving merchantability.

The protection part 123 may be integrated with the sealing part 122. That is, the protection part 123 may be integrated with the sealing part 122 when the pouch is manufactured through a pouch sheet, and thus, the process may be simplified, the manufacture may be easy, and the cost may be reduced.

The protection part 123 may comprise one or more protrusions 123a for reinforcing the strength. That is, a portion of a surface of the protection part 123 may be formed to protrude outside, thereby forming one or more protrusions 123a. Accordingly, the strength of the protection part 123 may be reinforced through the protrusion 123a, and thus, the strength of the sealing part 122 that is close or adjacent to the protection part 123 may be reinforced.

Referring to the enlarged view of FIG. 3, the protrusion 123a may protrude toward front and rear sides of the protection part 123 to form a sealing space 123-1 therein. A reinforcement component 123b made of a synthetic resin material having elastic restoring force may be inserted into the sealing space 123-1 to reinforce the strength of the protrusion 123a. Here, the reinforcement component 123b may be recovered from the protrusion 123a and then reused when the protection part 123 is removed from the sealing part.

An impact detection sensor that detects impact force transmitted from the tray may be inserted into the sealing space 123-1. The impact detection sensor measures the impact force transmitted from the tray to the pouch, and when the measured impact force is equal to or greater than inputted impact force, the impact detection sensor outputs a signal to sort out normal and defective products. That is, when the impact force measured by the impact detection sensor is less than the inputted impact force, it may be determined that no deformation occurs in the protection part, and thus, the signal may not be outputted. When the measured impact force is equal to or greater than the inputted impact force, it may be determined that the deformation is highly likely to occur in the sealing part and the accommodation part together with the protection part, and thus, the signal may be outputted.

In particular, the protrusion 123a has a circular shape when viewed in FIG. 2. That is, the circular protrusion 123a may have a curved outer circumferential surface to effectively disperse a transmitted impact, thereby significantly preventing the protrusion 123a from being folded.

Here, although the circular protrusion is described as one embodiment of the present invention, the protrusion may have various shapes such as a triangular shape, a square shape, a polygon shape, a ring shape, and the like. That is, the protrusion of the present invention may be realized according to various embodiments.

The protrusion 123a may be disposed on one end or both ends of the protection part 123, which is/are close or adjacent to the corner portion of the accommodation part 121. That is, the pouch 120 has large buckling or folding at the corner portion of the accommodation part 121, and thus, the protrusion 123a is disposed on the end of the protection part 123, which is close or adjacent to the corner portion of the accommodation part 121 to more stably protect the corner portion of the accommodation part 121.

When the transfer of the pouch 120 is completed, the protection part 123 may be removed from the sealing part 122. That is, the protection part 123 is removed from the pouch 120 by cutting a portion between the first sealing surface 122a and the protection part 123 to reduce a volume of the pouch 120.

A cutting line 123c having a groove or protrusion shape may be formed between the first sealing surface 122a and the protection part 123, and the protection part may be easily cut from the pouch 120 through the cutting line 123c.

The protection unit 123 is not thermally fused. That is, since the protection part 123 is removed after the pouch is transferred, the protection part 123 is not thermally fused to simplify a process and reduce a process cost.

Hereinafter, in descriptions of another embodiment of the present invention, constituents having the same function as the abovementioned embodiment have been given the same reference numeral in the drawings, and thus duplicated description will be omitted.

[Secondary Battery According to Second Embodiment of the Present Invention]

A secondary battery 100 according to a second embodiment of the present invention comprises the pouch 120 according to the first embodiment.

Figure 4:
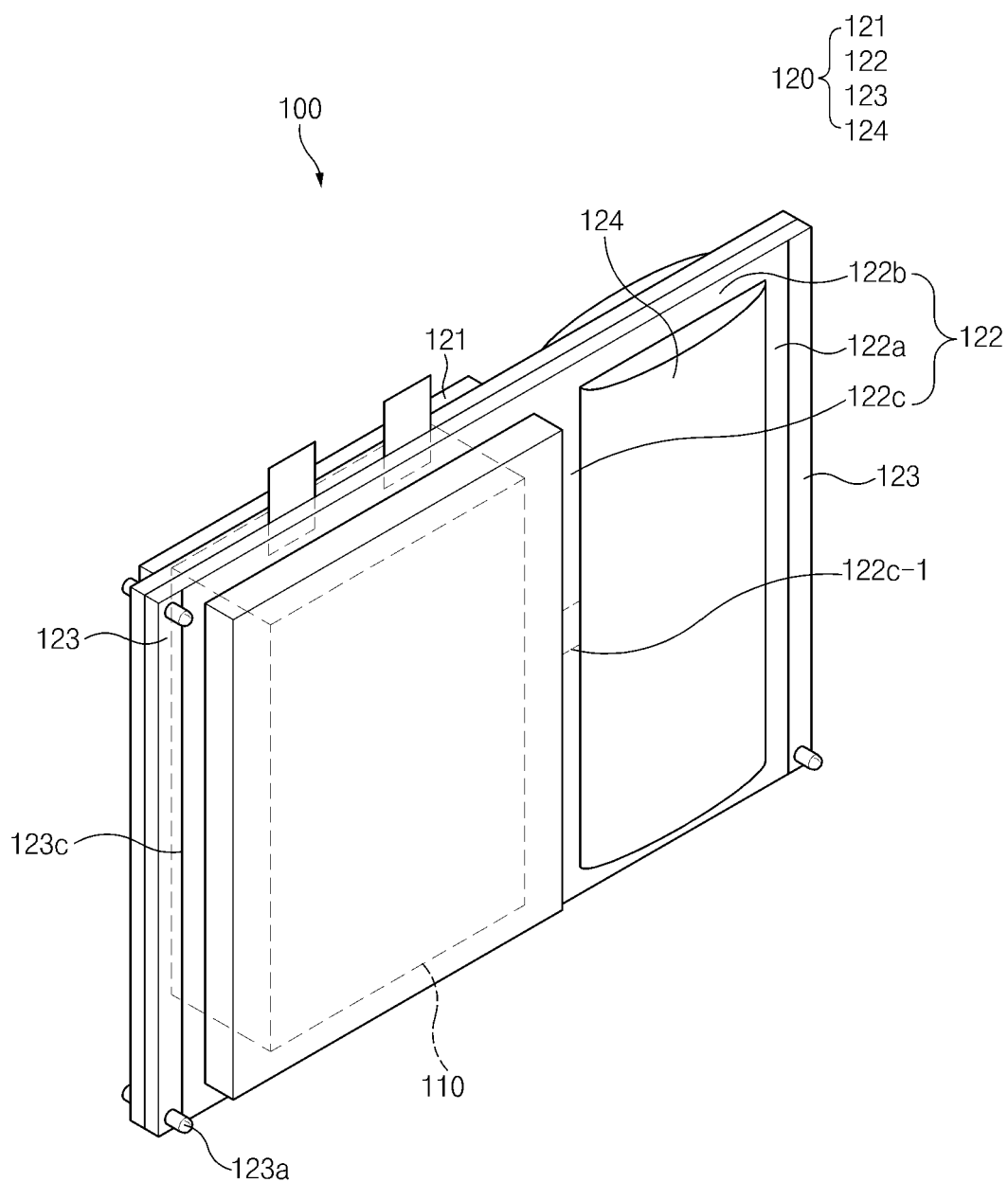
FIG. 4 is a perspective view of a secondary battery according to a second embodiment of the present invention.

That is, as illustrated in FIG. 4, the secondary battery 100 according to the second embodiment of the present invention comprises an electrode assembly 110 and a pouch 120 accommodating the electrode assembly 110.

Electrode Assembly

The electrode assembly 110 comprises a plurality of electrodes that are stacked in a state of interposing a separator therebetween, and the plurality of electrodes comprise a positive electrode and a negative electrode. Also, the electrode assembly 110 comprises an electrode tab that is withdrawn out of the pouch 120.

Pouch

The pouch 120 comprises an accommodation part 121 accommodating the electrode assembly 110, a sealing part 122 provided along an edge of the accommodation part 121 to seal the accommodation part 121, a gas pocket part 124 provided between the accommodation part 121 and the sealing part 122 to collect a gas generated in the accommodation part 121, and a protection part 123 provided outside the sealing part 122 to protect the accommodation part 121 together with the sealing part 122.

Here, the pouch 120 has the same configuration and function as the pouch according to the first embodiment, and thus a detailed description thereof will be omitted.

When the secondary battery 100 having the above-described configuration according to the second embodiment of the present invention is transferred, the sealing part and the accommodation part of the pouch may be prevented from being deformed, for example, buckled or folded by an impact, thereby preventing the electrode assembly from being damaged.

Figure 5:
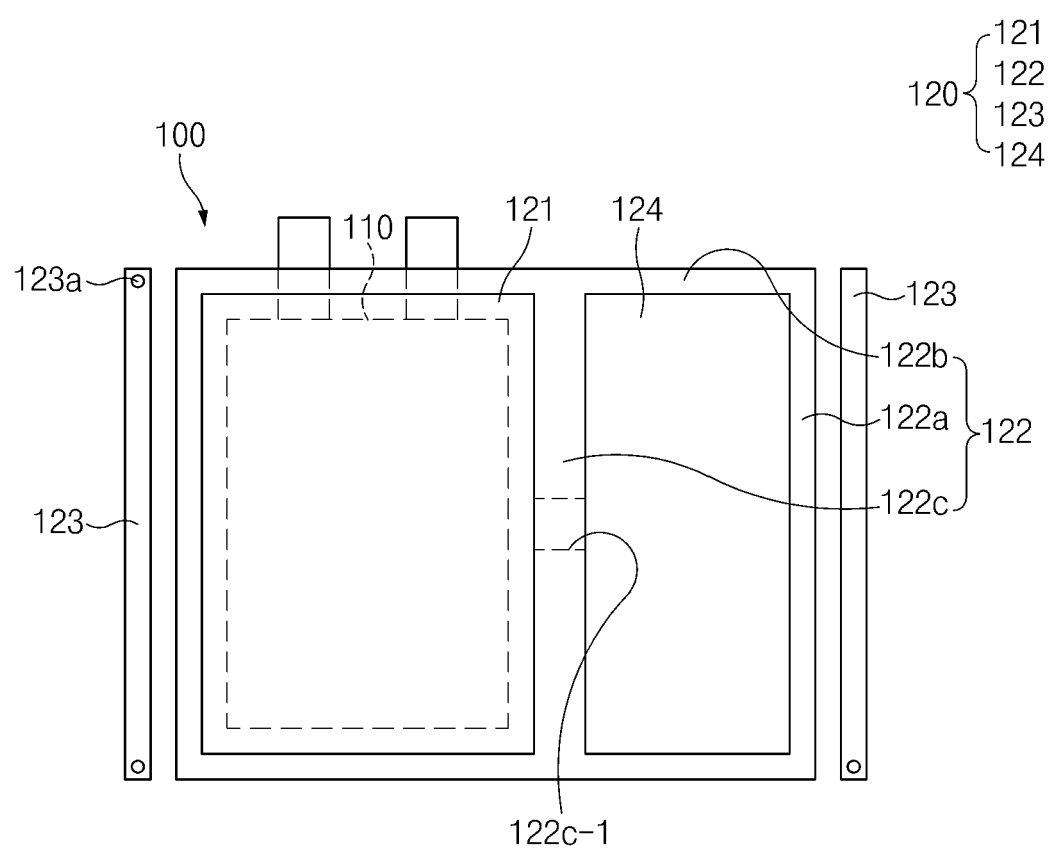
FIG. 5 is a front view illustrating a state in which a protection part is removed from the secondary battery according to the second embodiment of the present invention.

As illustrated in FIG. 5, in the secondary battery 100 according to the second embodiment of the present invention, when the protection part 123 is removed from the sealing part 122, a sealing surface from which the protection part 123 is removed is resealed. That is, the sealing surface may be deformed while the protection part 123 is removed, and thus, sealing force may be reduced. In order to solve the above-described problem, the sealing surface may be resealed after the protection part 123 is removed, and thus, the sealing force of the pouch 120 may increase.

A method for manufacturing the secondary battery having the above-described configuration according to the second embodiment of the present invention will be described as follows.

[Method for Manufacturing Secondary Battery According to Second Embodiment of the Present Invention]

Figure 6:
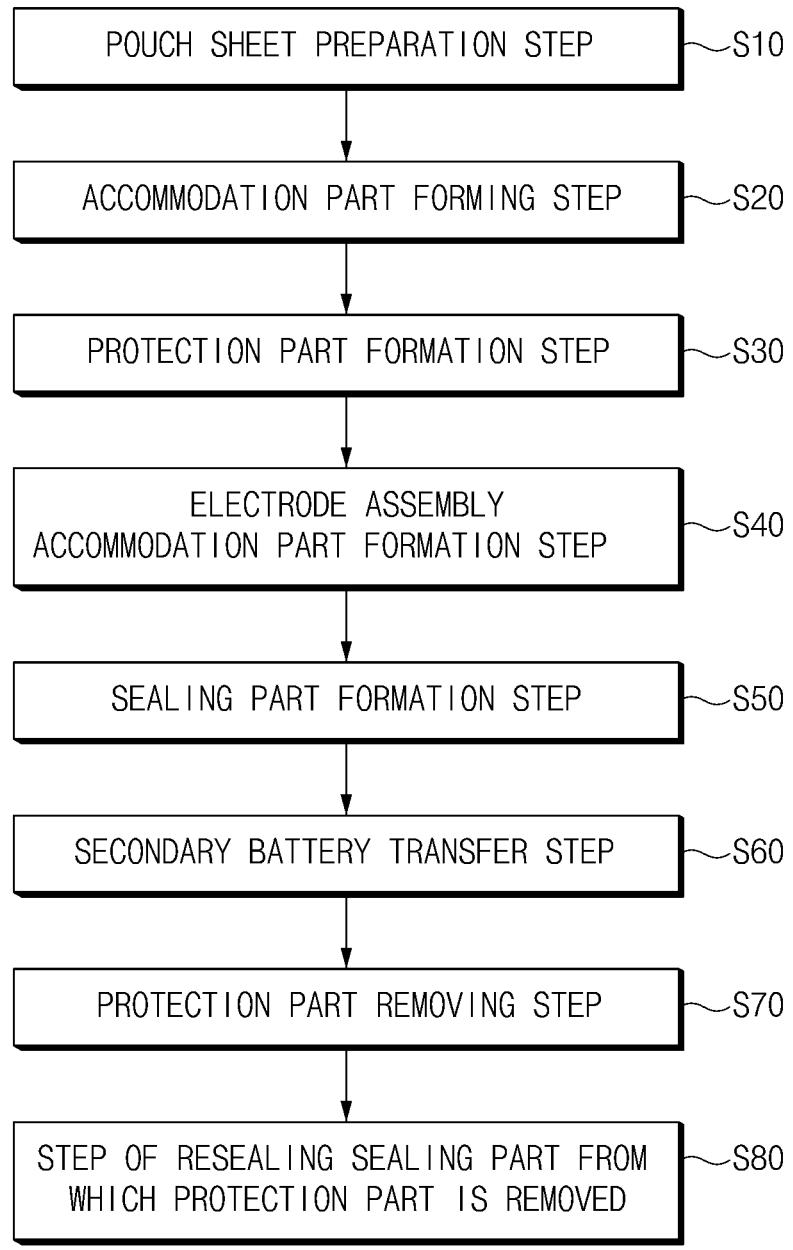
FIG. 6 is a flowchart illustrating a method for manufacturing the second battery according to the second embodiment of the present invention.

As illustrated in FIG. 6, a method for manufacturing the secondary battery according to the second embodiment of the present invention comprises a pouch sheet preparation step (S10), an accommodation part forming step (S20), a protection part formation step (S30), an accommodation part formation step (S40), and a sealing part formation step (S50).

Pouch Sheet Preparation Step

Figure 7:
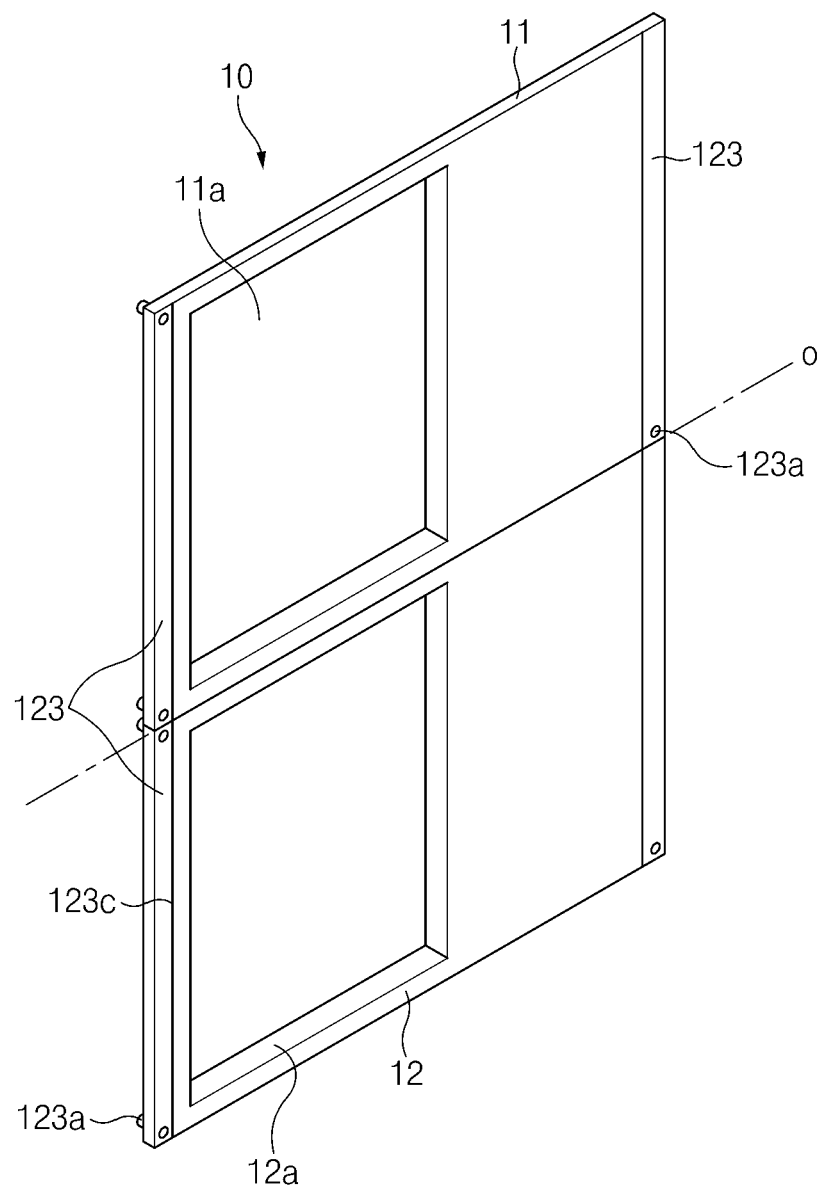
FIG. 7 is a perspective view illustrating a pouch sheet preparation step, an accommodation part forming step, and a protection part formation step.

As illustrated in FIG. 7, in the pouch sheet preparation step (S10), a pouch sheet 10 having a sheet shape is prepared, and a horizontal center line O that equalizes the pouch sheet 10 vertically is displayed on the pouch sheet 10. Then, the pouch sheet 10 is separated into an upper pouch 11 and a lower pouch 12 on the basis of the horizontal center line O.

Accommodation Part Forming Step

In the accommodation part forming step (S20), each of an upper accommodation part 11a and a lower accommodation part 12a, which respectively correspond to the upper pouch 11 and the lower pouch 12, is formed. That is, when the pouch sheet 10 is folded with respect to the horizontal center line O, the upper accommodation part 11a of the upper pouch 11 and the lower accommodation part 12a of the lower pouch 12 are formed to be connected to each other.

Protection Part Formation Step

In the protection part formation step (S30), a cutting line 123c is displayed on each of left and right ends of the upper pouch 11 and the lower pouch 12 to form a protection part 123 having a predetermined width. Here, the width of the protection part is less than a width between the protection part and the accommodation part. This is done because the width between the protection part and the accommodation part becomes the sealing part so that the width of the sealing part is secured to be greater than that of the protection part to increase in sealing force.

When the protection part 123 is formed, a portion of a surface of the protection part 123 is formed to protrude outward, thereby forming one or more protrusions 123a. In particular, the protrusion 123a is formed on a surface of the protection part 123, which is close or adjacent to a corner portion of the accommodation part in which deformation largely occurs.

Here, the protrusions 123a formed on the protection parts 123 of the upper pouch 11 and the lower pouch 12 may be connected to each other when the pouch sheet 10 is folded with respect to the horizontal center line O.

The accommodation part forming step (S20) and the protection part formation step (S30) may be performed at the same time to simplify the process. That is, the upper accommodation part 11a and the lower accommodation part 12a, which correspond to the upper pouch 11 and the lower pouch 12, are formed, and simultaneously, the one or more protrusions 123a are formed on the surface of the protection part 123.

Accommodation Part Formation Step

Figure 8:
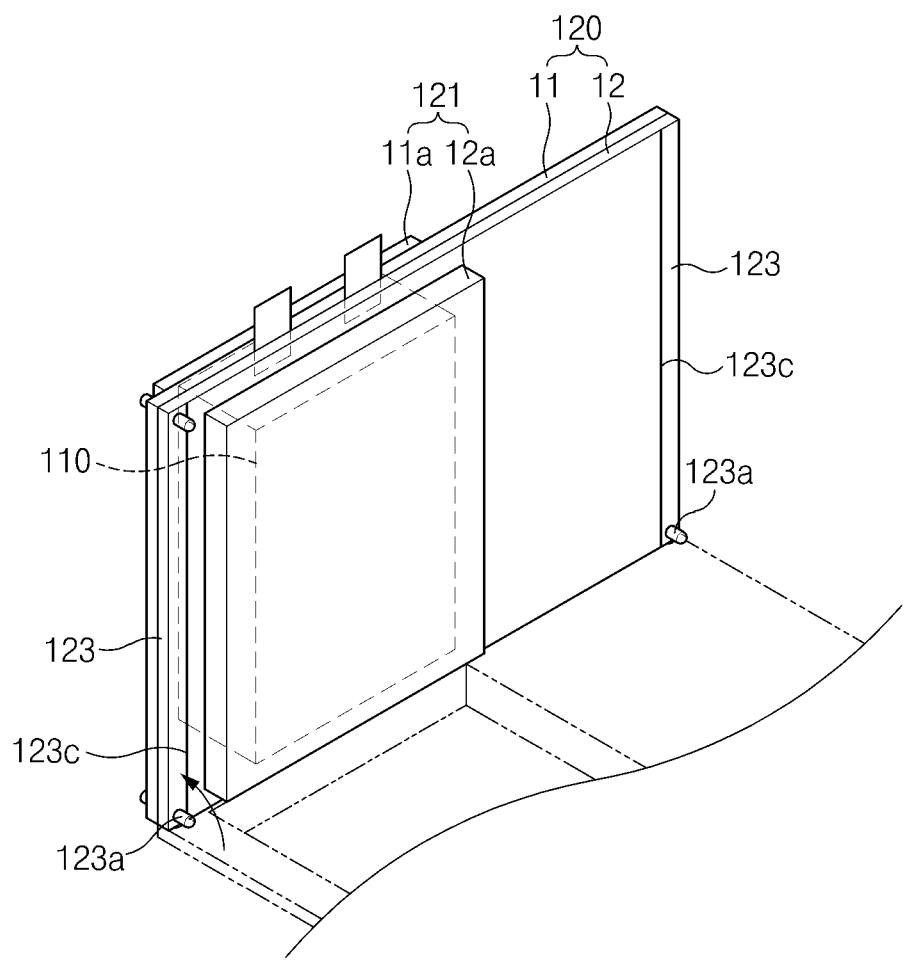
FIG. 8 is a perspective view illustrating an electrode assembly accommodation part formation step.

In the accommodation part formation step (S40), as illustrated in FIG. 8, the pouch sheet 10 is folded with respect to the horizontal center line O. Then, the pouch 120 is formed while the upper pouch 11 and the lower pouch 12 are folded, and the accommodation part 121 is formed while the upper accommodation part 11a and the lower accommodation part 12a are connected to each other.

Sealing Part Formation Step

Figure 9:
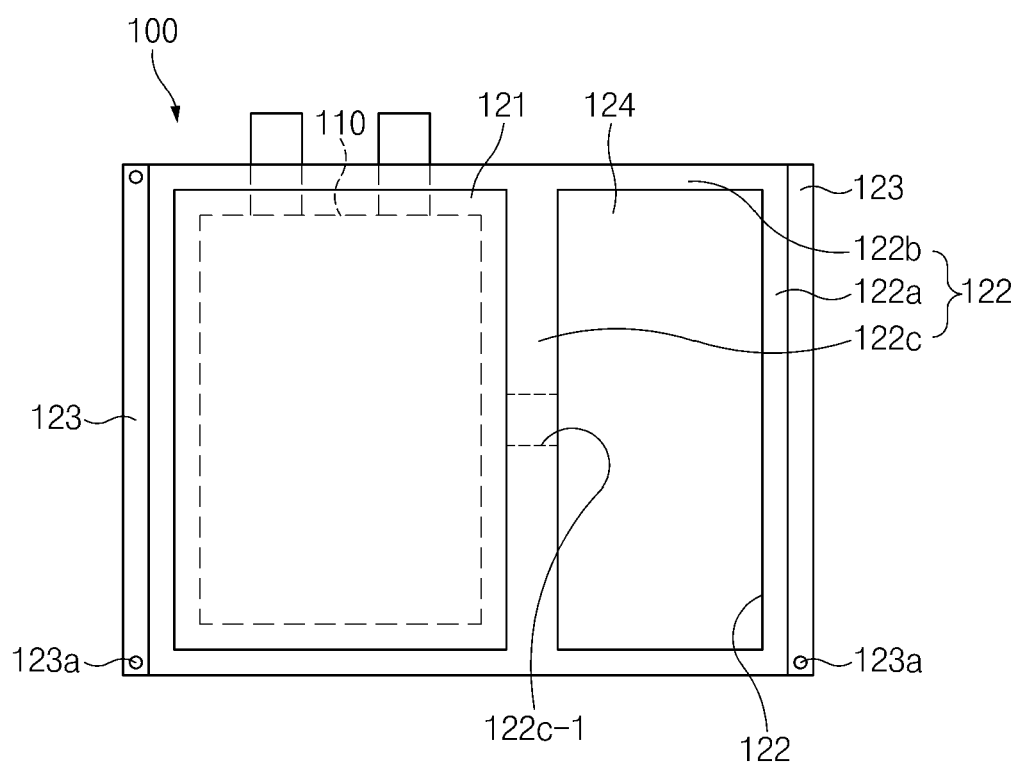
FIG. 9 is a front view illustrating a sealing formation step.

As illustrated in FIG. 9, in the sealing part formation step (S50), the electrode assembly 110 is accommodated in the accommodation part 121, and then, upper and lower ends of the accommodation part 121 are sealed between the accommodation part 121 and the protection part 123. Then, the accommodation part 121 may be sealed while the sealing part 122 is formed on an edge surface of the pouch 120, and thus, the secondary battery 100 may be manufactured.

Here, the sealing part formation step (S50) may further comprise a process of forming a gas pocket part between the accommodation part 121 and the sealing part. That is, in the gas pocket part formation process, sealing is further performed between the accommodation part 121 and the sealing part 122 to form an auxiliary sealing surface 122c in which an inlet hole 122c-1 is formed. In summary, in the pouch 120, the accommodation part 121 is formed at a left side, and the gas pocket part 124 is formed at a right side with respect to the auxiliary sealing surface 122c.

The protection part 123 may not be sealed because the protection part 123 is removed after the secondary battery is transferred, and thus, adding of unnecessary processes may be prevented.

After the sealing part formation step (S50), a transfer step (S60) of transferring the secondary battery 100 to an activation process is further performed.

Transfer Step

Figure 10:
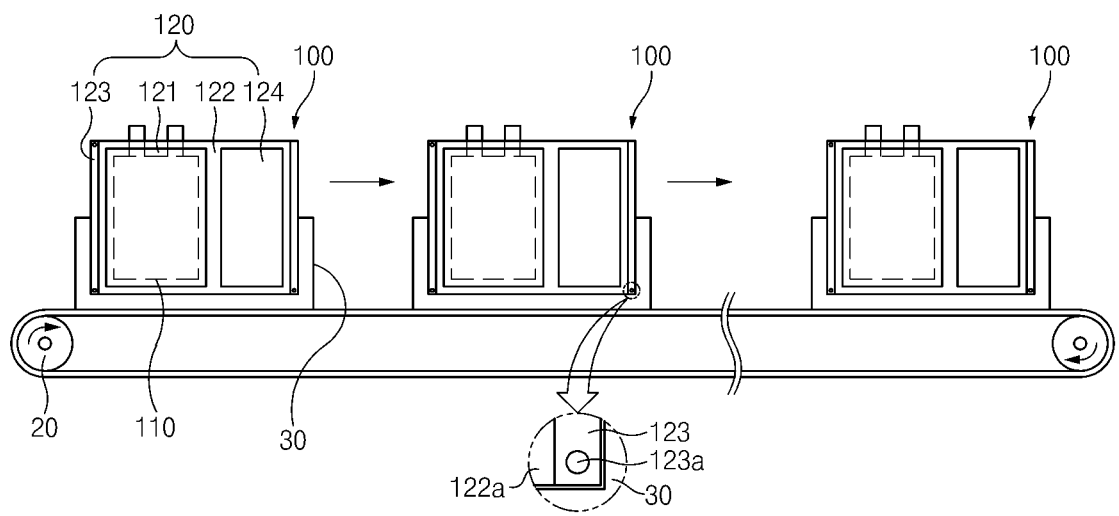
FIG. 10 is a side view illustrating a secondary battery transfer step.

That is, as illustrated in FIG. 10, in the transfer step (S60), the secondary battery 100 is accommodated in one or more trays 30 that move along a conveyor belt. Here, the secondary battery 100 is accommodated so that the protection part 123 is supported on a sidewall or a bottom surface of the tray 30 to prevent the sealing part 122 and the accommodation part 121 of the pouch 120 from being directly supported on the sidewall or the bottom surface of the tray, thereby significantly preventing the sealing part 122 and the accommodation part 121 of the pouch 120 from being deformed, for example, buckled or folded. In particular, the protection part 123 may comprise the one or more protrusions 123a to significantly prevent the sealing part and the accommodation part of the pouch 120 from being deformed.

After the transfer step (S60), a protection part removing step (S70) of removing the protection part may be further performed.

Protection Part Removing Step

Figure 11:
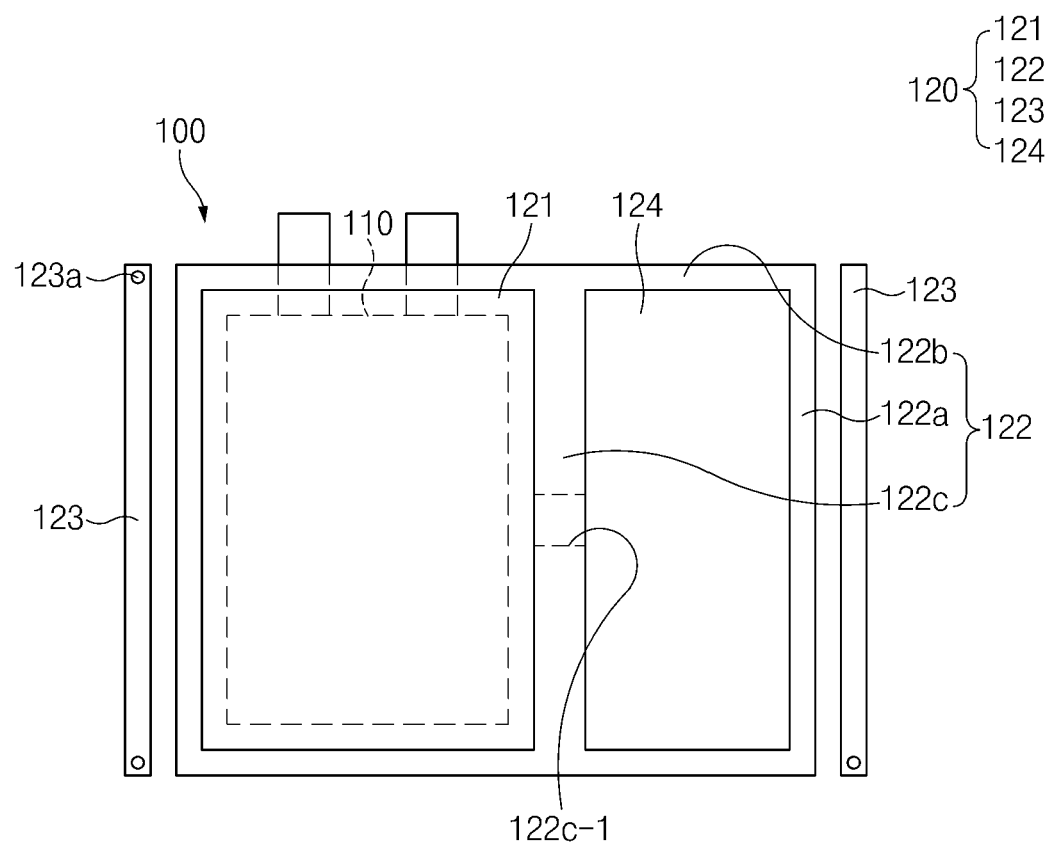
FIG. 11 is a front view illustrating a protection part removing step and a sealing part resealing step.

That is, as illustrated in FIG. 11, in the protection part removing step (S70), when the transfer of the secondary battery 100 is completed, the function of the protection part 123 is lost, and thus, the protection part 123 may be cut to be removed from the sealing part 122.

After the removing step (S70), a sealing part resealing step (S80) of resealing the sealing part 122 from which the protection part 123 is removed may be further performed.

Sealing Part Resealing Step

That is, in the sealing part resealing step (S80), the sealing surface from which the protection part 123 is removed is resealed to increase in sealing force.

In the method for manufacturing the secondary battery, which comprises the above-described steps, according to the second embodiment of the present invention, when the secondary battery is manufactured, the protection part may be formed to prevent the electrode assembly accommodated in the secondary battery from being damaged when the secondary battery is transferred, thereby significantly improving quality of the product.

[Pouch According to Third Embodiment of the Present Invention]

Figure 12:
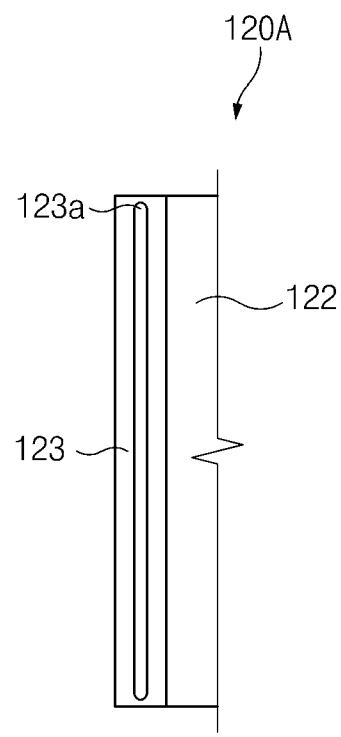
FIG. 12 is a front view of a pouch according to a third embodiment of the present invention.

As illustrated in FIG. 12, in a pouch 120A according to a third embodiment of the present invention, a protrusion 123a is disposed on a protection part 123. Here, the protrusion 123a is lengthily disposed in a longitudinal direction of the protection part 123.

That is, in the pouch 120A according to the third embodiment of the present invention, the protrusion 123a disposed on the protection part 123 increases in length to improve strength of the protection part 123.

[Pouch According to Fourth Embodiment of the Present Invention]

Figure 13:
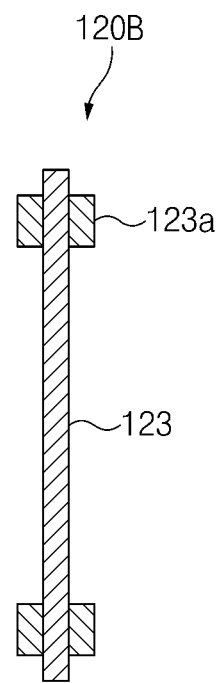
FIG. 13 is a cross-sectional view of a pouch according to a fourth embodiment of the present invention.

As illustrated in FIG. 13, in a pouch 120B according to a fourth embodiment of the present invention, a protrusion 123a is disposed on a protection part 123. Here, the protrusion 123a is provided as a separate component and thus is detachably attached to a surface of the protection part 123.

That is, the pouch 120B according to the fourth embodiment of the present invention may comprise the protrusion 123a that is detachably attached to the surface of the protection part 123 to increase in reusability and convenience. In particular, the protrusion 123a may move to a portion that is weak in strength on the surface of the protection part and then be attached to the portion.

[Pouch According to Fifth Embodiment of the Present Invention]

Figure 14:
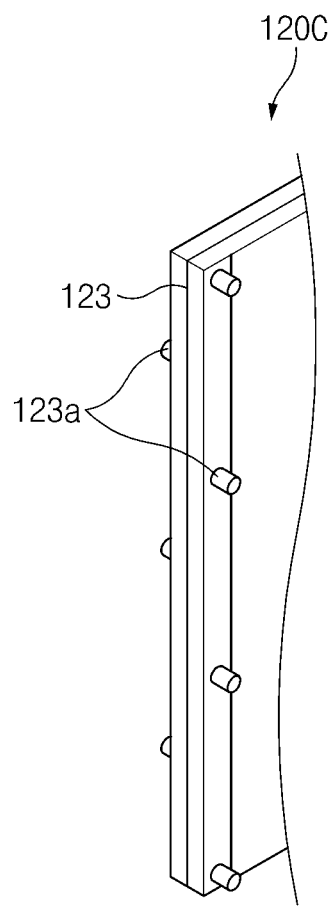
FIG. 14 is a perspective view of a pouch according to a fifth embodiment of the present invention.

As illustrated in FIG. 14, a pouch 120C according to a fifth embodiment of the present invention, a protrusion 123a is disposed on a protection part 123. Here, the protrusion 123a crosses front and rear surfaces of the protection part 123 in a zigzag manner without corresponding to the front and rear surfaces to increase in strength of an entire surface of the protection part 123 by using the minimum protrusion 123a.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

The invention claimed is:

1. A pouch comprising:
   an accommodation part configured to accommodate an electrode assembly;
   a sealing part provided outside the accommodation part, the sealing part having a plurality of sealing surfaces configured to seal the accommodation part; and
   a protection part integrated with an outer peripheral region of one or more of the plurality of sealing surfaces of the sealing part, the protection part being configured to protect the one or more sealing surfaces,
   wherein the protection part is provided with one or more protrusions for reinforcing strength.

2. The pouch of claim 1, wherein the one or more protrusions protrude to an outside of the pouch.

3. The pouch of claim 1, wherein the protection part is provided on the sealing surface of the one or more sealing surfaces that is disposed on one side in a width direction of the pouch.

4. A secondary battery comprising:
   an electrode assembly; and
   the pouch of claim 1.

5. The secondary battery of claim 4, wherein the protection part is removable from each of the sealing surfaces.

6. The secondary battery of claim 4, wherein the protection part is not thermally fused.

7. A method for manufacturing a secondary battery, the method comprising:
   a pouch sheet preparation step of preparing a pouch sheet on which an upper pouch and a lower pouch are formed with respect to a horizontal center line that equalizes the pouch sheet vertically;
   an accommodation part forming step of forming an upper accommodation part and a lower accommodation part, which respectively correspond to the upper pouch and the lower pouch;
   a protection part formation step of forming one or more protrusions that protrude outside from left and right ends of the upper pouch and the lower pouch to form a protection part;
   an accommodation part formation step of folding the upper pouch and the lower pouch with respect to the horizontal center line so that the upper and lower accommodation parts are connected to each other to form an accommodation part; and
   a sealing part formation step of sealing a portion between the accommodation part and the protection part and upper and lower ends of the accommodation part to manufacture the secondary battery, wherein the protection part is integrated with an outer peripheral region of the sealing part wherein the sealing part formation step further comprises a process of further sealing a portion between the accommodation part and the sealing part to form a gas pocket part between the accommodation part and the sealing part, wherein the accommodation part is provided at one side in a width direction of the pouch, and the gas pocket part is provided at another side in the width direction of the pouch, and wherein the protection part is provided on each of the sealing surface of the one or more sealing surfaces that is disposed at one side of the accommodation part and the sealing surface of the one or more sealing surfaces that is disposed at another side of the gas pocket part in the width direction of the pouch.

8. The method of claim 7, wherein the accommodation part and the gas pocket part are connected to each other through a non-sealed path.

9. The method of claim 7, further comprising, after the sealing part formation step, a transfer step of accommodating the secondary battery in a tray to transfer the secondary battery, wherein the secondary battery is accommodated so that the protection part is supported by a side surface of a bottom surface of the tray.

10. The method of claim 9, further comprising, after the transfer step, a protection part removing step of removing the protection part from each of the sealing surfaces of the pouch.

11. The method of claim 10, further comprising, after the removing step, a sealing part resealing step of resealing the sealing part from which the protection part is removed.

12. The method of claim 10, wherein, in the sealing part formation step, the protection part is not sealed.

13. The pouch of claim 1, wherein the one or more protrusions are provided by attaching a component made of a synthetic resin material to the protection part.

14. The pouch of claim 1, wherein the protection part is provided on the sealing surfaces of the plurality of sealing surfaces disposed on each of both sides in a width direction of the pouch.

15. The pouch of claim 1, wherein the one or more protrusions are disposed on both ends of the protection part, which are adjacent to the corner portion of the accommodation part.

* * * * *